(12) United States Patent
Bullard et al.

(10) Patent No.: US 11,246,318 B1
(45) Date of Patent: Feb. 15, 2022

(54) SUBMERSION CONVEYOR SYSTEM AND METHODS THEREOF

(71) Applicant: Zee Company, Chattanooga, TN (US)

(72) Inventors: Robert C. Bullard, Signal Mountain, TN (US); Battle Glascock, Soddy Daisy, TN (US); James A. Faller, Chattanooga, TN (US); Jonathon R. Bullard, Chattanooga, TN (US)

(73) Assignee: Zee Company, Chattanooga, TN (US)

( * ) Notice: Subject to any disclaimer, the term of this patent is extended or adjusted under 35 U.S.C. 154(b) by 811 days.

(21) Appl. No.: 14/950,995

(22) Filed: Nov. 24, 2015

Related U.S. Application Data

(60) Provisional application No. 62/084,265, filed on Nov. 25, 2014.

(51) Int. Cl.
| | |
|---|---|
| *A23B 4/26* | (2006.01) |
| *A23P 1/08* | (2006.01) |
| *A23B 4/06* | (2006.01) |
| *B08B 3/04* | (2006.01) |
| *B65G 15/30* | (2006.01) |

(52) U.S. Cl.
CPC ............. *A23B 4/26* (2013.01); *A23B 4/062* (2013.01); *A23P 1/08* (2013.01); *B08B 3/041* (2013.01); *B65G 15/30* (2013.01); *A23V 2002/00* (2013.01)

(58) Field of Classification Search
CPC ... A23B 4/26; A23B 4/062; A23P 1/08; B08B 3/041; B65G 15/30; A23V 2002/00
See application file for complete search history.

(56) References Cited

U.S. PATENT DOCUMENTS

| | | | | |
|---|---|---|---|---|
| 3,123,476 A | * | 3/1964 | Ash et al. ............... | C12C 7/205 |
| | | | | 426/600 |
| 3,316,833 A | * | 5/1967 | Williams ................. | A21B 5/08 |
| | | | | 99/369 |
| 3,326,116 A | * | 6/1967 | Belshaw .................. | A21B 5/08 |
| | | | | 99/354 |
| 3,343,504 A | * | 9/1967 | Beik ....................... | A21C 15/00 |
| | | | | 118/406 |
| 3,474,726 A | * | 10/1969 | Curtin ................. | A47J 37/1214 |
| | | | | 99/404 |
| 3,761,290 A | * | 9/1973 | Brunner .............. | A47J 37/1214 |
| | | | | 99/330 |
| 3,844,402 A | * | 10/1974 | Hayashi ................... | A21B 3/07 |
| | | | | 198/465.1 |
| 3,905,285 A | * | 9/1975 | Campbell ........... | A47J 37/1214 |
| | | | | 99/353 |
| 3,991,440 A | * | 11/1976 | Hendrickson, Jr. .. | A22C 7/0038 |
| | | | | 425/294 |

(Continued)

*Primary Examiner* — Steven N Leff
(74) *Attorney, Agent, or Firm* — Brian L. Stender

(57) ABSTRACT

A submersion conveyor system for processing materials that need to be completely submersed in a processing liquid, such as food products, the submersion conveyor system providing a continual looping motion with a conveyor belt and flights providing a semi-enclosed volume for containing the material to be processed, the semi-enclosed volume containing the material to be processed being completely submersed in at least a portion of a processing tank during operation to provide a washing, rinsing, coating, treating, sanitizing and/or chilling or heating of the processing materials.

36 Claims, 3 Drawing Sheets

(56) References Cited

U.S. PATENT DOCUMENTS

| | | | | |
|---|---|---|---|---|
| 4,228,730 A | * | 10/1980 | Schindler | A47J 37/1214 126/391.1 |
| 4,254,696 A | * | 3/1981 | Ohtake | A47J 37/1214 426/439 |
| 4,308,286 A | * | 12/1981 | Anstett | A21B 5/08 426/19 |
| 4,357,862 A | * | 11/1982 | Anstett | A21B 5/08 426/438 |
| 4,361,016 A | * | 11/1982 | Multack | A23B 4/062 198/952 |
| 5,132,126 A | * | 7/1992 | Sinkler | A47J 37/1214 426/241 |
| 5,165,330 A | * | 11/1992 | Giacomini | A47J 37/1214 134/132 |
| 5,191,918 A | * | 3/1993 | Cahlander | B65B 1/32 141/1 |
| 5,454,297 A | * | 10/1995 | Phillips | A47J 37/1214 99/405 |
| 2002/0044996 A1 | * | 4/2002 | McNeel | A21C 11/04 426/549 |
| 2004/0028800 A1 | * | 2/2004 | Basker | A23L 7/13 426/637 |
| 2004/0247762 A1 | * | 12/2004 | Xu | A47J 37/047 426/523 |
| 2005/0260314 A1 | * | 11/2005 | Baker | A21D 6/00 426/496 |
| 2009/0143481 A1 | * | 6/2009 | Man | A23B 4/20 514/714 |
| 2015/0359234 A1 | * | 12/2015 | Meulendijks | A22C 7/0084 425/362 |

* cited by examiner

SUBMERSION CONVEYOR SYSTEM AND METHODS THEREOF

RELATED APPLICATION

The present application claims the benefit of U.S. Provisional Application No. 62/084,265, filed Nov. 25, 2014, which is hereby incorporated herein in its entirety by reference.

FIELD OF THE INVENTION

The present invention relates to a submersion conveyor apparatus that can be used in the processing of materials such as food products. In particular, the present invention relates to a submersion dip tank conveyor apparatus that provides a washing, rinsing, coating, treating, sanitizing and/or chilling or heating of materials, such as food products, in a continuous manner within a liquid solution in which the materials are completely submerged, in particular in the processing of solid, gelatinous or granular materials, more particularly in the processing of food products, such as protein food products like poultry carcasses and/or poultry parts.

BACKGROUND OF THE INVENTION

The world population has grown to a point where mass production of the foods that we consume is no longer a luxury but a requirement. Local farmers, providing food and food products directly to the marketplace, cannot meet the demands of modern society. The food supply chain now incorporates very large, complex farms and high speed and very high volume processing plants to satisfy the need for mass processing and production of food. Maintaining a safe food supply chain relies on the dedication of those working in the supply chain, the processing plants and also on the third party oversight of various federal agencies whose regulations support and mandate food safety.

With two major exceptions, the physical process of taking an animal from the farm to the consumer has changed very little over time. The introduction of refrigeration, and the implementation of various chemistries to help maintain sanitary conditions and to control microbiology, has given modern food processors an advantage not enjoyed by food producers of a century ago. Refrigeration and chemical intervention practices have become an integral part of food processing facility operations. These technologies have enabled the high speed, high volume output of the large processing facilities that could not have been possible in times past without significant concern for consumer safety. With large scale and continuous processing methods being employed by large processors of protein food products, or any other material or food product that is susceptible to microbiological contamination, the concern for the control of microbiology and the safety of the food supply chain is of paramount importance.

Another concern, as the demand for food products increases, is the impact on natural resources created by this demand. The ecological impact is directly affected by this growth and therefore new processes must be developed to reduce the impact any given process has on the environment. The ecological impact that a food processing plant has on the environment is no longer a passing concern but a major part of operations and planning Entire processes are built around the control and conservation of natural resources such as water. Older, outdated and less efficient processes are being replaced at significant cost with more efficient and less wasteful processes that maximizes the utility of available resources. No longer can a plant operate without concern for the conservation and sustainability of natural resources.

Very innovative approaches to the systems and methods used in processing facilities have been implemented to create profits for industry while maintaining low consumer cost of the final product. As new processes are developed, the federal agencies that have jurisdiction over any particular process are called upon to review the new approach and to ensure that the new innovation meets the current guidelines for safety. The higher the processors' output, the higher the risk of microbiological contamination, and therefore the more innovative the processor must be to combat this ever present threat to the food chain safety. As new risks are found, federal guidelines become more stringent.

Processing of materials currently utilizes open top liquid treatment systems to help maintain sanitary conditions and to control microbiology on such materials. In such open top liquid treatment systems, materials are transported on top of a conveyor. The materials may be delivered to a liquid tank where the conveyor follows a bed contour that lowers the materials into the liquid tank that may contain an intervention solution. The primary problem with this current form of processing is that the material density is typically lower than the liquid within the liquid tank, which may result in the material being processed floating on the surface of the liquid. Depending on the difference in density between the liquid and the material, a certain surface area of the material can be exposed to the atmosphere and not subjected to the liquid processes.

For example, in industrial processing of poultry, immediately after slaughter, bleeding, hot water immersion, feather withdrawal and viscera withdrawal, poultry carcasses have to be chilled to reduce their temperature from approximately 40° C. to 4° C., which contributes to ensure safe products. Immersion chilling is a relatively low cost and fast cooling technique largely used in South America and North America in countries such as the United State and Brazil, two of the biggest poultry producers in the word. In this system, poultry carcasses are forced to move through stainless steel tanks containing chilled water or a mixture of ice and water. These tanks may also contain antimicrobial intervention solutions to kill or provide a $\log_{10}$ reduction in the amount of any unwanted microorganisms. In one typical method, the process incorporates a large tank fitted with a sectionalized and gated conveyor that provides separate sections where the product is loaded. The gates are mounted on a chain-type conveyor and continually move through the chilled water bath with the gates providing segregation from one load to another. The gates continuously push a load of product through the chilled water bath, from the lead-in section to the lead-out section, at a speed that is designed to provide ample dwell time for the intended cooling purpose. However, the poultry carcasses and/or parts are transported by a conveyor where the materials are located on the top of the conveyor, which can result in the poultry carcasses and/or poultry parts having portions thereof being exposed to the atmosphere and not being subjected to the liquid processes.

Another method of accomplishing the same material handling operation is the use of a large diameter auger placed in the chiller tank in lieu of the moving gates described above. The auger flights determine the volume of product that can be loaded in each section and the auger rotational speed as well as the total length of the tank determines the dwell time the product will be allowed to remain in the chilled bath. But again, the poultry carcasses and/or parts may have portions thereof exposed to the atmosphere and not being subjected to the liquid processes.

As such, there is a need in the industry to efficiently, cost-effectively and safely process materials, such as protein food products, as well as systems for providing such processes.

SUMMARY OF THE INVENTION

The present invention is directed at a submersion conveyor system and methods of processing materials using the submersion conveyor system.

In some aspects, the submersion conveyor system comprises a processing tank and a conveyor assembly, the processing tank having a frame supporting a material transport bed with two opposing tank sidewalls and two opposing endwalls defining an interior tank volume, and the conveyor assembly located at least partially within said interior tank volume during processing, wherein the material transport bed traverses a product entrance end and a product discharge end, wherein the material transport bed has a contoured bed design that includes a submersion tank portion located intermediate between the product entrance end and the product discharge end in the interior tank volume located below a processing liquid line, and wherein the conveyor assembly has a conveyor belt and at least two flights attached to the conveyor belt that in conjunction with the material transport bed and two opposing tank sidewalls completely submerses the material to be processed in the processing liquid at least proximate the submersion tank portion during processing, the conveyor belt moving in a direction from the product entrance end to the product discharge end when processing a food product.

In some aspects, the conveyor assembly comprises a conveyor support frame system providing a conveyor track having a top side and a bottom side, a conveyor belt, a plurality of flights or raised blades that are positioned down the length of the conveyor belt, a conveyor drive motor, and a conveyor belt take up. During operational use, the conveyor belt and the plurality of flights move in a continual looping motion with respect to the material transport bed, including the submersion tank portion of the material transport bed, with the plurality of flights rigidly attached to the conveyor belt forming substantially the same contour of at least that of the material transport bed and a bottom of the submersion tank portion.

In some aspects, the conveyor support frame system is designed to retain the conveyor belt in a support guide assembly located on both sides of the conveyor belt proximate the two associated opposing side walls, which maintains the position of the conveyor belt as it is driven by the conveyor drive motor. In some aspects, the conveyor belt and the plurality of flights follow this contour in a continual looping motion during operation from the product entrance end to the product discharge end when the respective portion of the conveyor belt and the respective flights of that portion of the conveyor belt are located and/or moving on the underside of the conveyor track and then from the product discharge end back to the product entrance end when the respective portion of the conveyor belt and the respective flights of that portion of the conveyor belt are located and/or moving on the topside of the conveyor track.

In some aspects, the plurality of flights attached to the conveyor belt are substantially perpendicular to and extending away from an outer surface of the conveyor belt. In some aspects, each of the plurality of flights have a top edge or flight tip that are proximately located the material transport bed and submersion tank bottom within the interior tank volume when the respective portion of the conveyor belt and the respective flights of that portion of the conveyor belt are located and/or moving on the underside of the conveyor track, with the respective portion of the conveyor belt located further away from the material transport bed and submersion tank bottom than the top edges of the respective flights. When the respective portion of the conveyor belt is moving on the topside of the conveyor track, the top edges of the respective plurality of flights attached to that portion of the conveyor belt are substantially perpendicular and extending away from the interior tank volume.

In some aspects, the top edge of the respective flights may operably engage with and/or slide across the material transport bed and/or the submersion tank bottom when the respective portion of the conveyor belt and respective flights are located and/or moving on the bottom side of the conveyor track. In some aspects, the top edges of the flights may comprise a plastic material, such as HDPE, LDPE, PEEK, PET, polypropylene, PTFE or other pliable or semi-rigid plastic materials, that minimizes friction when operably engaging and/or sliding across the material transport bed and/or the submersion tank bottom. In some aspects, the material transport bed and/or the submersion tank bottom comprises a metal material, such as stainless steel, steel, a metal alloy, such as alloy 20, and the like. In some other aspects, the top surface of the material transport bed and/or submersion tank comprises a semi-rigid plastic material, such as HDPE, LDPE, PEEK, PET, polypropylene, PTFE, and the like.

In some aspects, there is a space between the top edges or the flight tips of the respective flights and the material transport bed and/or the submersion tank bottom when the conveyor belt is located and/or moving on the bottom side of the conveyor track allowing for restriction-free motion of the conveyor belt during operation. In some aspects, the space is between about $1/16$ inches and about 6 inches, in some aspects about $1/4$ inch to about 4 inches, in some aspects about $3/8$ inch to about 2 inches, and in some other aspects about $1/2$ inch to about 1 inch. One of ordinary skill in the art will appreciate that other subranges within the foregoing ranges are contemplated depending on the size of the material being processed.

In some aspects, the conveyor belt has a width that fits within the opposing tank sidewalls. In some aspects, there is a gap between the opposing tank sidewalls and each side edge of the conveyor belt and/or plurality of flights allowing for restriction-free motion of the conveyor belt during operation. In some aspects, the gap is between about $1/16$ inch and about 6 inches, in some aspects about $1/4$ inch to about 4 inches, in some aspects about $3/8$ inch to about 2 inches, and in some other aspects about $1/2$ inch to about 1 inch. One of ordinary skill in the art will appreciate that other subranges within the foregoing ranges are contemplated depending on the size of the material being processed.

In some aspects, as two adjacent flights on the conveyor belt are positioned above the material transport bed and/or submersion tank bottom, a first semi-closed volume is formed by the two adjacent flights, the first flight forming a leading end and the second flight forming a trailing end, the conveyor belt forming a top of the semi-closed volume, the respective portion of the two stationary opposing tank sidewalls forming side ends of the semi-closed volume, and a bottom of the material transport bed and/or submersion tank bottom depending on the location of the two adjacent flights within the interior tank volume defining a bottom end of the semi-closed volume. As the conveyor system moves during processing, the second flight forming the trailing end then becomes the leading end in a subsequent semi-closed volume, with the next adjacent flight now forming the trailing end. In other words, each flight located within the interior tank volume during processing forms a leading end for a first semi-closed volume and a trailing end for a subsequent semi-closed volume. Once the product load reaches the discharge end, the respective flight no longer forms a semi-closed volume as the flights are no longer operationally engaged with the material transport bed and/or opposing tank sidewalls until the respective flight traverses the loop back to the entrance end where the product load is fed into the submersion conveyor system.

In some aspects, at the entrance end and as the conveyor belt and the respective flights make the turn from the topside of the conveyor assembly to the bottom side of the conveyor assembly around a conveyor pulley, the material to be processed will be delivered via upstream transport means to an open hopper section formed by the material transport bed and the opposing tank sidewalls, with an open space for loading the product load found in between the leading flight and the trailing flight. The open space acts as a receiving volume for the materials. As the trailing flight makes the turn from the top side of the conveyor assembly to the bottom side of the conveyor assembly, the trailing flight will make contact with a portion of the material to be processed and thus move the respective portion of material loaded into the open space in the direction of travel for the conveyor belt and flights. As the material is pushed forward into the processing tank, and the trailing flight continues to move around the conveyor pulley, the trailing flight will come progressively closer to an upper surface of the material transport bed forming the semi-enclosed volume described above. Once the material is enclosed in the semi-closed volume, the material will be pushed forward into the process. The conveyor belt and flights follow the guided contour of the conveyor support system, which substantially matches at least the contour of the material transport bed and submersion tank bottom, allowing the semi-enclosed volume to deform into the same contour throughout the entire length of the process. The material contained within the semi-enclosed volume also undergoes complete submersion within the processing liquid as the semi-closed volume moves from the entrance end to the discharge end.

In some aspects, the conveyor belt comprises a perforated material, such as a perforated plastic, rubber and/or metal material, the perforated material allowing the processing liquid to drain back into the interior tank volume when the respective portion of the conveyor belt is no longer located with respect to the submersion tank portion during processing. In some aspects, the perforated material comprises a plurality of apertures within the material. One of ordinary skill in the art will appreciate that the apertures can be various sizes and shapes depending upon the size and shape of food product to be processed.

In some aspects, the plurality of flights comprise a perforated material, such as a perforated plastic, rubber and/or metal material, the perforated flight material minimizing the force with the processing liquid in the submersion tank portion during processing and/or allowing the processing liquid to drain back into the interior tank volume when the respective portion of the conveyor belt is no longer located with respect to the submersion tank portion during processing.

In some aspects, the material transport bed comprises a metal material, preferably stainless steel.

In some aspects, a portion of the material transport bed comprises a perforated material proximately located between the submersion tank portion and the product discharge end. In some aspects, the perforated portion of the material transport bed comprises stainless steel. The perforated portion of the material transport bed allows the processing liquid that is located on the material being processed and/or dripping from the conveyor belt and/or flights to drip back into the interior tank volume and into the submersion tank portion to minimize the loss and waste of water and intervention chemistry within the processing liquid.

In some aspects, the submersion conveyor system comprises air sparge inlets that allow mixing of the processing liquid during operation and/or infusion of any gaseous species or plasmas into the solution. In some aspects, the air sparge inlets are located within the submersion tank portion. In some aspects, the gaseous species or plasmas infused into the solution are the same chemical materials as the intervention chemistry in the processing liquid.

In some aspects, the submersion conveyor system comprises one or more water inlets, the one or more water inlets providing water make-up to the submersion tank portion to maintain the proper volume of processing liquid within the submersion tank portion. In some aspects, the water make-up contains the chemical intervention solution.

In some aspects, the submersion conveyor system comprises a drain for removal of the processing liquid, whether by overflow or for draining the interior tank volume for cleaning and sanitizing.

In some aspects, the submersion conveyor system comprises a water spill over weir and/or scum skimmer, which trap floating materials and/or fats, oils and/or grease from the processing liquid during operation. In some aspects, the weir and scum skimmer strain the floating materials and/or fats, oils and/or grease from the processing liquid, such that the processing liquid is reusable.

In some aspects, each of the plurality of flights has a length extending away from the conveyor belt, the length being in the range between about 1 inch to about 3 feet, in some aspects about 2 inches to about 2 feet, in some aspects about 6 inches to about 18 inches, and in some other aspects about 9 inches to about 1 foot. One of ordinary skill in the art will appreciate that other subranges within the foregoing ranges are contemplated, as well as other lengths not specified. For example, the length of the flights may depend upon the material being processed, such that poultry carcasses may have a flight of about 1 foot to about 18 inches while poultry parts may have flights of about 3 inches to about 9 inches.

In some aspects, the material transport bed and submersion tank portion have a relatively smooth surface providing minimal friction resistance as the material to be processed is pushed or moved from the entrance end to the discharge end by the conveyor assembly.

In some aspects, the submersion conveyor system comprises a tensioner for keeping the conveyor belt tight during processing.

In some aspects, the submersion conveyor system comprises an arm. In some aspects, the arm raises the conveyor assembly away from the interior tank volume, allowing for the interior tank volume to be cleaned and sanitized after an operational shift. In some aspects, the arm lowers the conveyor assembly into the interior tank volume after cleaning and/or sanitizing for processing. In some aspects, the arm is pivotable one end of the submersion conveyor system such that the arm moves in an arc motion during the raising and lowering operations.

In some aspects, the conveyor drive motor can be located proximate the product discharge end and the conveyor belt take up located proximate the product entrance end. Alternatively, the conveyor drive motor can be located proximate the product entrance end and the conveyor belt take up located proximate the product discharge end.

In some aspects, the submersion conveyor system comprises a product in-feed hopper for continually feeding the product load into the semi-enclosed volumes as the conveyor belt and the plurality of flights continually move in the loop during processing. In some aspects, the submersion conveyor system comprises a feed belt for continually feeding the product load into the semi-enclosed volumes as the conveyor belt and the plurality of flights continually move in the loop during processing.

In some aspects, the submersion conveyor system comprises a product discharge chute for expelling the product load after the product load has undergone complete submersion within the processing liquid within the submersion tank portion. In some aspects, the submersion conveyor system comprises a conveyor belt for moving the product load away from the submersion conveyor system after the product load has undergone complete submersion within the processing liquid within the submersion tank portion.

In some aspects, the submersion conveyor system provides a washing, rinsing, coating, treating, sanitizing, and/or chilling or heating of the material being processed. In some aspects, the material to be processed is a solid material, a gelatinous material, or a granular material. In some aspects, the material to be processed is a food product. In some other aspects, the food product is a protein food product, such as poultry (i.e., chicken, turkey, duck), beef, pork, and/or fish or parts of the foregoing protein food products. In some other aspects, the food product is produce (i.e., fruits or vegetables) or nuts.

During operation, the interior tank volume is filled with a processing liquid to a liquid level, the liquid level having a height such that the conveyor belt and respective flights, as well as the product contained therein, are completely submersed within the processing liquid when the conveyor belt and respective flights are located proximate the submersion tank portion. In some aspects, the conveyor track guide ensures that the entire conveyor belt and respective flights, and thus the respective semi-enclosed volume, located proximate the submersion tank portion travel under the surface of the processing liquid. As the semi-enclosed volume and the material contained therein are made to move in a downward slope into the submersion tank portion and thus the processing liquid, the entire semi-enclosed volume, including the material contained therein, is forced under a surface of the processing liquid. If the material has a density that is higher than the processing liquid, the material will settle to the bottom of the semi-enclosed volume but will be continually pushed forward by the trailing flight of the respective semi-enclosed volume. If the material has a density that is lower than the processing liquid, the material will be subjected to an upward force that is equal to the weight of the processing liquid volume the material is displacing. This upward force will cause the material to rise or buoy up; however, the conveyor belt forming the top of the semi-enclosed volume, which in at least some portions of the interior tank volume is located under the surface of the processing liquid, keeps the material from floating and forces the material under the surface of the processing liquid.

In some aspects, the processing liquid comprises a chemical intervention solution chosen from chlorine, bromine, cetylpyridinium chloride (CPC), an organic acid, a peroxycarboxylic acid, trisodium phospate, acidified sodium chlorite, and chlorine dioxide.

In some aspects, the processing liquid comprises at least one peroxycarboxylic acid having 2-18 carbon atoms. In some aspects, the peroxycarboxylic acid solution is chosen from peroxyformic acid, peroxypropionic acid, peroxyacetic acid, peroxybutanoic acid, peroxypentanoic acid, peroxyhexanoic acid, peroxyheptanoic acid, peroxyoctanoic acid, peroxynonanoic acid, peroxydecanoic acid, peroxyundecanoic acid, peroxydodecanoic acid, peroxylactic acid, peroxymaleic acid, peroxyascorbic acid, peroxyhydroxyacetic acid, peroxyoxalic acid, peroxymalonic acid, peroxysuccinic acid, peroxyglutaric acid, peroxyadipic acid, peroxypimelic acid, peroxysubric acid, and mixtures thereof. Preferably, the intervention solution comprises an equilibrium peroxyacetic acid or a pH modified peroxyacetic acid.

In some aspects, the equilibrium peroxyacetic acid preferably has a pH above about 3.0 and below about 7.0, in some aspects about 3.5 to about 5.5, and in some other aspects about 3.5 to about 5.0, although subranges within these ranges is contemplated.

In some aspects, the pH modified peroxycarboxylic acid preferably has a pH above about 7.0 and below about 10.0, in certain aspects a pH range of about 7.0 to about 9.5, and in some other aspects a pH range of about 7.5 to about 9.0, although subranges within these ranges is contemplated. The pH modified peroxycarboxylic acid can be prepared by combining a peroxycarboxylic acid solution, such as a peroxyacetic acid solution, with one or more buffering agents chosen from sodium hydroxide, potassium hydroxide, the sodium salt of carbonic acid, the potassium salt of carbonic acid, phosphoric acid, silicic acid or mixtures thereof, in a quantity that is necessary to bring the solution to said pH range One of ordinary skill in the art will appreciate that other alkalizing chemistries approved for direct food contact may also be used, whether alone or in combination with any of the foregoing buffering agents. The quantity of the buffering agent in a buffered peroxycarboxylic acid solution will generally be in the range of about 0.01% to about 10% by volume of the total solution, but other volumes of the buffering agent may be utilized depending upon various parameters, such as local water condition, including pH, hardness and conductivity.

The above summary is not intended to describe each illustrated embodiment or every implementation of the subject matter hereof. The figures and the detailed description that follow more particularly exemplify various embodiments.

Figure 1:
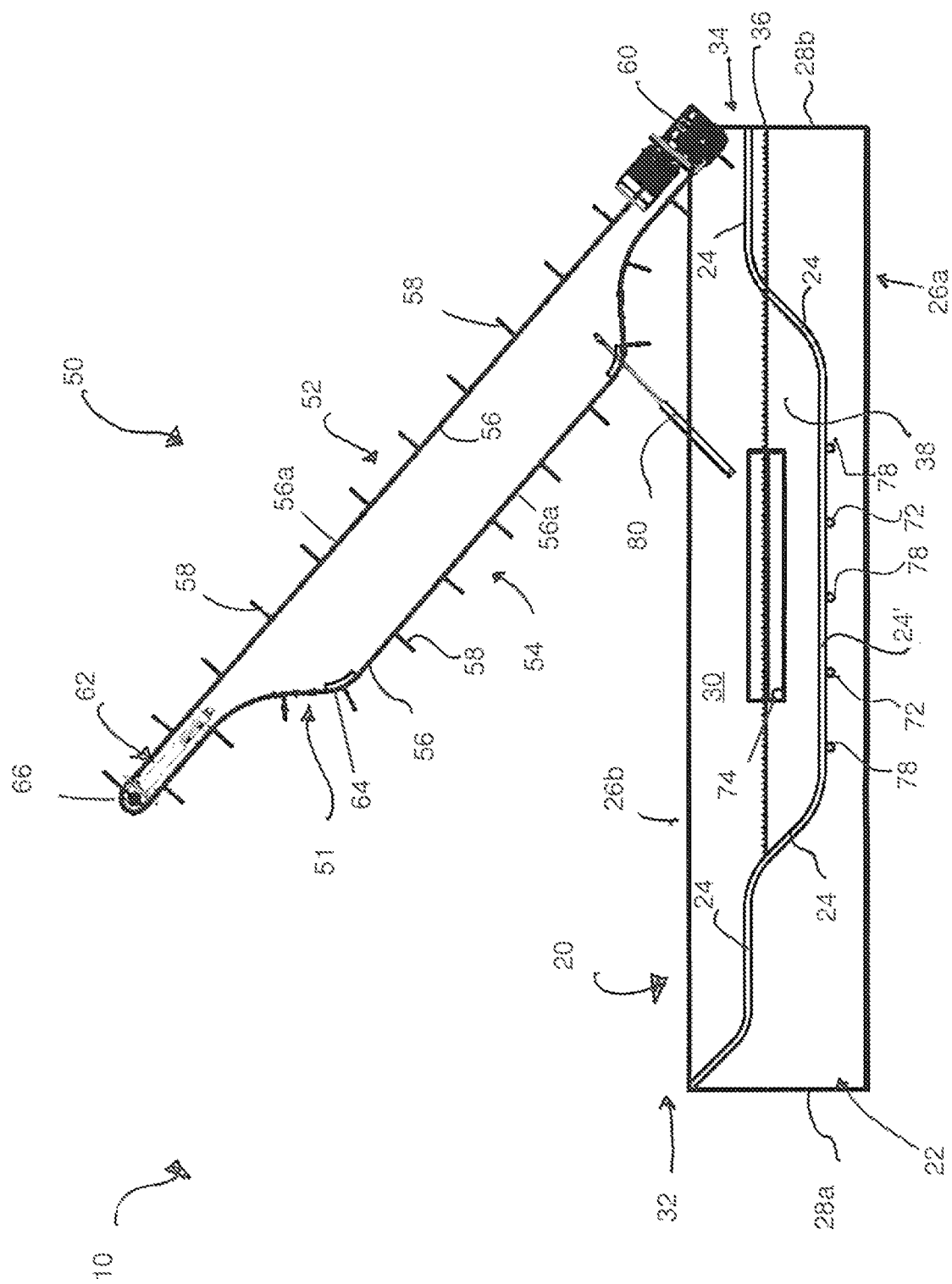
FIG. 1 is a side cross-sectional view of a submersion conveyor system according to certain embodiments of the present invention, the submersion conveyor system having conveyor assembly in a raised position for cleaning and/or sanitizing the conveyor assembly and/or the processing tank.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2:
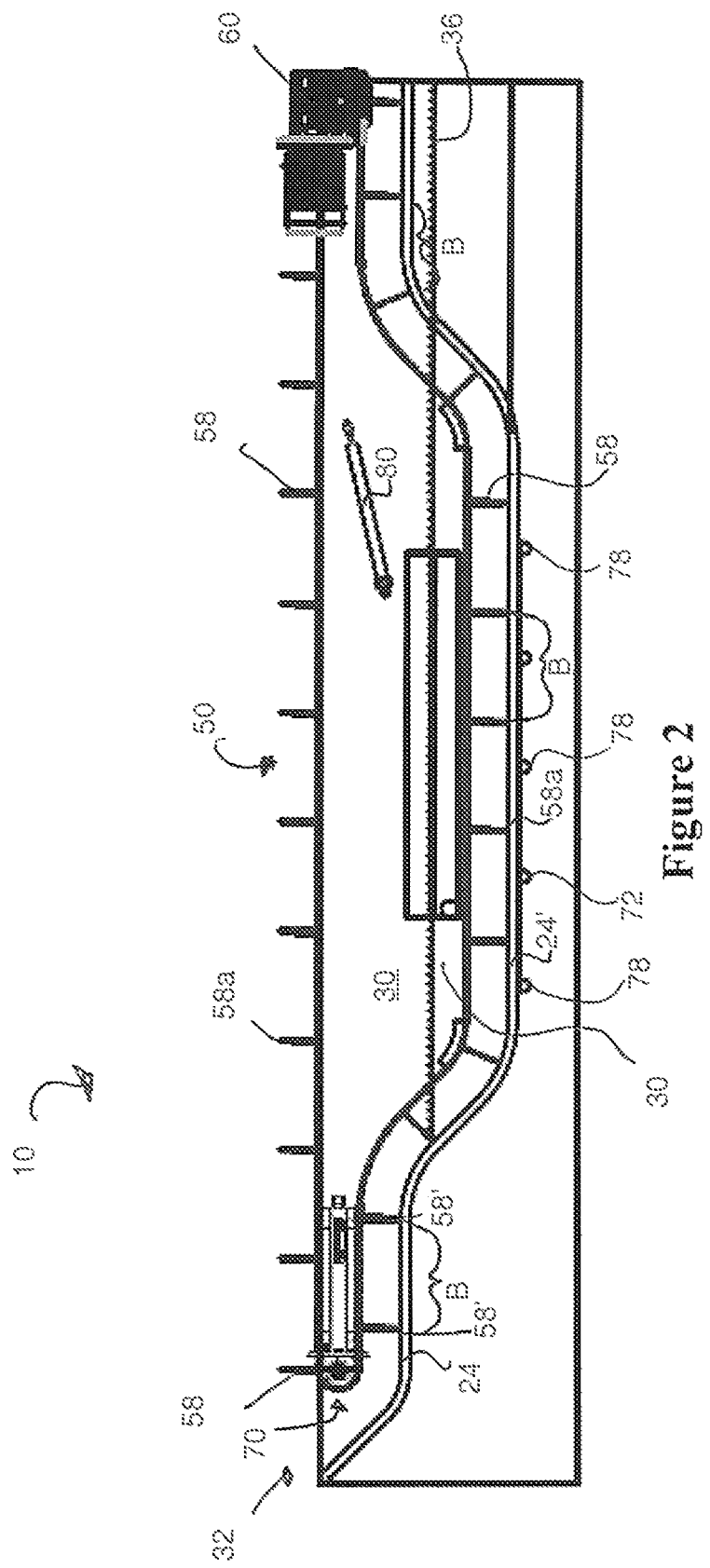
FIG. 2 is a side cross-sectional view of the submersion conveyor system of FIG. 1 according to certain embodiments of the present invention, the submersion conveyor system having conveyor assembly in a lowered position for processing.
Figure 3:
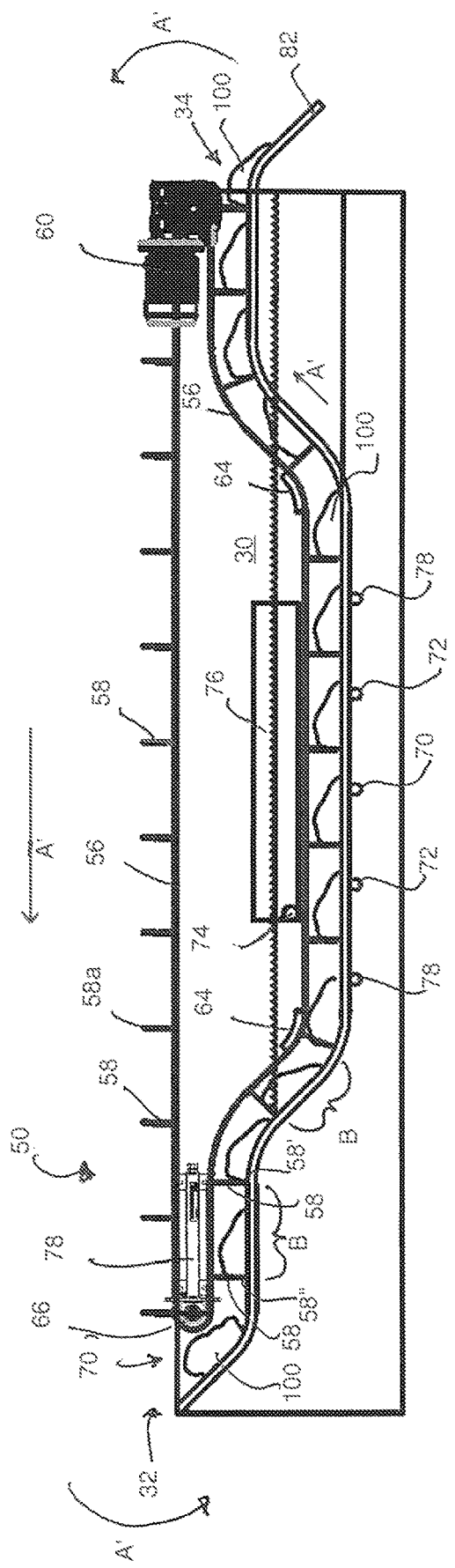
FIG. 3 is a side cross-sectional view of a submersion conveyor system according to certain embodiments of the present invention, the submersion conveyor system having product being completely submersed in a processing liquid during operation in at least a portion of the interior tank volume.

Referring now to the figures, FIGS. 1-3 generally illustrate a submersion conveyor system 10 of the present invention, the submersion conveyor system having a processing tank 20 and a conveyor assembly 50.

The processing tank 20 has a frame 22 supporting a material transport bed 24 with two opposing tank sidewalls 26a, 26b and two opposing endwalls 28a, 28b defining an interior tank volume 30. During processing, the conveyor assembly 50 is located at least partially within the interior tank volume 30. The material transport bed 24 extends between a product entrance end wall 28a and a product discharge end wall 28b, wherein the material transport bed 24 has a contoured bed design that includes a submersion tank portion 24' located intermediate between the product entrance end wall 28a and the product discharge end wall 28b in the interior tank volume 30. During operation, at least the submersion tank portion 24' of the material transport bed 24 is located below a processing liquid 38, such that there is a processing liquid line 36 by which the product 100 being processed is completely submersed during operation.

The conveyor assembly 50 comprises a conveyor support frame system providing a conveyor track 51 having a top side 52 and a bottom side 54, a conveyor belt 56 that runs along the conveyor track during normal operation, a plurality of flights or raised blades 58 that are positioned along the running length of the conveyor belt 56, a conveyor drive motor 60 and a conveyor belt take up 62. In some aspects, the conveyor drive motor 60 is located proximate the product discharge end while the conveyor belt take up 62 is located proximate the product entrance end. In some other aspects, the conveyor drive motor 60 is located proximate the product entrance end while the conveyor belt take up 62 is located proximate the product discharge end.

During normal operational use, the conveyor belt 56 and plurality of flights 58 move in a continual looping motion A' along the conveyor track with respect to the material transport bed 24, including the submersion tank portion 24', with the plurality of flights 58 rigidly attached to the conveyor belt 56 forming substantially the same contour of at least that of the material transport bed 24 and a bottom of the submersion tank portion 24'.

The conveyor support frame system is designed to retain the conveyor belt 56 in a support guide assembly 64 located on both sides of the conveyor belt 56 proximate the two opposing tank side walls 26a, 26b, which maintains the position of the conveyor belt 56 as it is driven by the conveyor drive motor 60. The conveyor belt 56 and the plurality of flights 58 follow the contour in a continual looping motion during operation as previously discussed.

The plurality of flights 58 attached to the conveyor belt 56 can be substantially perpendicular to and extending away from an outer surface 56a of the conveyor belt 56. Each of the plurality of flights 58 have a top edge or flight tip 58a that are proximately located the material transport bed 24 and the bottom of the submersion tank portion 24' within the interior tank volume 30 when the respective portion of the conveyor belt 56 and the respective flights 58 of that portion of the conveyor belt 56 are located and/or moving on the bottom side 54 of the conveyor track 51, with the respective portion of the conveyor belt 56 located further away from the material transport bed 24 and the bottom of the submersion tank portion 24' than the top edges 58a of the respective flights 58. When the respective portion of the conveyor belt 56 is moving on the top side 52 of the conveyor track 51, the top edges 58a of the respective plurality of flights 58 attached to that portion of the conveyor belt 56 are substantially perpendicular and extending away from the interior tank volume 30.

The top edge 58a of the respective flights 58 may operably engage with and/or slide across the material transport bed 24 and/or the submersion tank bottom 24' when the respective portion of the conveyor belt 56 and respective flights 58 are located within the interior tank volume 30 and moving on the bottom side 54 of the conveyor track 51. The top edges 58a of the flights 58 may comprise a plastic material that minimizes friction when operably engaging and/or sliding across the material transport bed 24 and/or the submersion tank bottom 24'. The material transport bed 24 and/or the submersion tank bottom 24' preferably comprise a metal material, such as stainless steel.

In some embodiments, a space may exist between the top edges or the flight tips 58a of the respective flights 58 and the material transport bed 24 and/or the submersion tank bottom 24' when the conveyor belt 56 is located and/or moving on the bottom side 54 of the conveyor track 51 allowing for restriction-free motion of the conveyor belt 56 during operation. In some aspects, the space is between about 1/16 inch and about 6 inches, in some aspects about 1/4 inch to about 4 inches, in some aspects about 3/8 inches to about 2 inches, and in some other aspects about 1/2 inch to about 1 inch. One of ordinary skill in the art will appreciate that other subranges within the foregoing ranges are contemplated depending on the size of the material being processed.

In some embodiments, the conveyor belt 56 has a width that fits within the opposing tank sidewalls 26a, 26b. In some aspects, there is a gap between the respective opposing tank sidewall 26a, 26b and the respective side edge of the conveyor belt 56 and/or plurality of flights 58 allowing for restriction-free motion of the conveyor belt 56 and flights 58 during operation. In some aspects, the gap is between about 1/16 inch and about 6 inches, in some aspects about 1/4 inches to about 4 inches, in some aspects about 3/8 inch to about 2 inches, and in some other aspects about 1/2 inch to about 1 inch. One of ordinary skill in the art will appreciate that other subranges within the foregoing ranges are contemplated depending on the size of the material being processed.

The conveyor belt 56 and each two adjacent flights 58 on the conveyor belt 56 are used to form a semi-closed volume B, as shown in FIGS. 2 and 3, for processing material. For instance, as shown best in FIG. 3, when the conveyor belt 56 and two adjacent flights 58 are positioned on the bottom side 54 of the conveyor tracking 51 and above the material transport bed 24 and/or submersion tank bottom 24', a semi-closed volume B is formed by the two adjacent flights 58, the first flight 58 forming a leading end 58' and the second flight 58 forming a trailing end 58" the conveyor belt 56 forming a top of the semi-closed volume B, the respective portion of the two stationary opposing tank sidewalls 26a, 26a forming side ends of the semi-closed volume B, and a bottom of the material transport bed 24 and/or submersion tank bottom 24' (depending on the location of the two adjacent flights 58 within the interior tank volume 30) defining a bottom end of the semi-closed volume B. As the conveyor assembly is in a processing motion, the second flight 58 forming the trailing end 58" becomes the leading end 58' in a subsequent semi-closed volume B, with the next adjacent flight 58 now forming the trailing end 58". In other words, each flight 58 located within the interior tank volume 30 during processing forms a leading end 58' for a first semi-closed volume B and a trailing end 58" for a subsequent semi-closed volume B'. Once the product load reaches the product discharge end 34, the respective flight 58 no longer forms a semi-closed volume B as the flights 58 are no longer operationally engaged with the material transport bed 24 and/or opposing tank sidewalls 26a, 26b until the respective flight 58 traverses the loop back to the product entrance end 32 where the product load or material 100 is fed into the submersion conveyor system 10.

At the product entrance end 32 and as the conveyor belt 56 and the respective flights 58 make the turn from the top side 52 of the conveyor assembly 50 to the bottom side 54 of the conveyor assembly 50 around a conveyor pulley 66, the product load 100 to be processed will be delivered via upstream transport means to an open hopper section formed by the material transport bed 24 and the opposing tank sidewalls 26a, 26b, with an open space 70 for loading the product load found in between the respective leading flight 58' and the respective trailing flight 58". The open space 70 acts as a receiving volume for one or more of the materials. As the trailing flight 58" makes the turn from the top side 52 of the conveyor assembly 50 to the bottom side 54 of the conveyor assembly 50, the trailing flight 58" will make contact with a portion of the product load 100 to be processed and thus move the respective portion of product load 100 loaded into the open space 70 in the direction of travel A' for the conveyor belt 56 and flights 58.

As the material 100 is pushed forward into the processing tank 20, and the trailing flight 58" continues to move around the conveyor pulley 66, the trailing flight 58" will come progressively closer to an upper surface of the material transport bed 24 forming the semi-enclosed volume B described above. Once the material 100 is enclosed in the semi-closed volume B, the material 100 will be pushed forward along looping motion A' into the process. The conveyor belt 56 and flights 58 follow the guided contour of the conveyor support system, which substantially matches at least the contour of the material transport bed 24 and submersion tank bottom 24', allowing the semi-enclosed volume B to deform into the same contour throughout the entire length of the process. The material 100 contained within the semi-enclosed volume B also undergoes complete submersion within the processing liquid 36 proximate the submersion tank bottom 24' as the semi-closed volume B moves from the product entrance end 32 to the product discharge end 34. As illustrated in FIG. 3, proximate the submersion tank portion 24', the processing liquid 38 has a volume within the interior tank volume 30 such that there is a processing liquid line 36 under which the semi-enclosed volume B (including at least a portion of the conveyor belt 56, flights 58 and product material 100) is completely submersed in the processing liquid 38 during operation.

The conveyor belt 56 preferably comprises a perforated material, such as a perforated plastic, rubber and/or metal material, the perforated material allowing the processing liquid 38 to drain back into the interior tank volume 30 when the respective portion of the conveyor belt 56 is no longer located with respect to the submersion tank portion 24' during processing.

Each of the plurality of flights 58 may comprise a perforated material, such as a perforated plastic, rubber and/or metal, the perforated flight material minimizing the force with respect to the processing liquid 38 in the submersion tank portion 30 during processing and/or allowing the processing liquid 38 to drain back into the interior tank volume 30 when the respective portion of the conveyor belt 56, to which the respective flight 58 is attached, is no longer located with respect to the material transport bed 24 and/or submersion tank portion 24' during processing. Alternatively, each of the plurality of flights 58 may comprise a substantially solid material, such that the processing liquid 38 is also pushed from the product entrance end 32 towards the product discharge end 34 during processing to help mix the processing liquid 38 within the interior tank volume 30.

The material transport bed 24 and submersion tank portion 24' preferably comprise a metal material, preferably stainless steel.

In some embodiments, a portion of the material transport bed 24 comprises a perforated material proximately located between the submersion tank portion 24' and the product discharge end 34. The perforated portion of the material transport bed 24 preferably comprises stainless steel. The perforated portion of the material transport bed 24 allows the processing liquid 38 that is located on the material 100 being processed, dripping from the conveyor belt 56, dripping from the flights 58, to drip back into the interior tank volume 30 and into the submersion tank portion 24' to minimize the loss and waste of water and/or intervention chemistry within the processing liquid 38. At least a portion of the perforated material may be partially located below the processing liquid line 36. Alternatively, the entire perforated material may be located above the processing liquid line 36. One of ordinary skill in the art will appreciate that during processing, the processing liquid line 36 may fluctuate depending upon the amount of water and/or intervention chemistry loss and make-up changing the height of the processing liquid line 36 within the interior volume tank 30, such that the perforated material located at least partially below the processing liquid line 36 may not be located entirely above the processing liquid line 36. However, the processing liquid line 36 is preferably maintained at a consistent level during normal operation. One of ordinary skill in the art will also appreciate that the processing liquid line 36 may be located at a different height for different materials 100 that can be processed in the submersion conveyor system 10.

The submersion conveyor system 10 may comprise one or more air sparge inlets 78 located within the interior tank volume 30, preferably proximate the submersion tank portion 24', that allows mixing of the processing liquid 38 during operation.

The submersion conveyor system 10 may comprise one or more water inlets 72, the one or more water inlets 72 providing water make-up to the interior tank volume 30, preferably proximate the submersion tank portion 24', to maintain the proper volume of processing liquid 38 within the submersion tank portion and to maintain the desired processing liquid line 36. In some aspects, the water make-up contains an intervention chemistry in solution.

The submersion conveyor system 10 may comprise a drain 74 for removal of the processing liquid 38, whether by overflow or for draining the interior tank volume 30 for cleaning and/or sanitizing.

The submersion conveyor system 10 may comprise a water spill over weir and/or scum skimmer 76, which trap floating materials and/or fats, oils and/or grease from the processing liquid 38 during operation. The weir and scum skimmer 76 can strain the floating materials and/or fats, oils and/or grease from the processing liquid 38, such that the processing liquid is reusable.

In some preferred embodiments, each of the plurality of flights 58 has a length extending away from the conveyor belt 56, the length being in the range between about 1 inch to about 3 feet, in some aspects about 2 inches to about 2 feet, in some aspects about 6 inches to about 18 inches, and in some other aspects about 9 inches to about 1 foot. One of ordinary skill in the art will appreciate that other subranges within the foregoing ranges are contemplated, as well as other lengths not specified. For example, the length of the flights 58 may depend upon the material being processed, such that poultry carcasses may have a flight of about 1 foot to about 18 inches while poultry parts may have flights of about 3 inches to about 9 inches.

In a preferred embodiment, the material transport bed 24 and submersion tank portion 24' have a relatively smooth surface providing minimal friction resistance as the material 100 to be processed is pushed or moved from the product entrance end 32 to the product discharge end 34 by the conveyor assembly 50.

The submersion conveyor system 10 may comprise a tensioner 78 for keeping the conveyor belt 56 tight during processing.

In some preferred embodiments, the submersion conveyor system 10 comprises an operational arm 80 for raising and lowering the conveyor assembly 50. The operational arm 80 can raise the conveyor assembly 50 away from the interior tank volume 30, allowing for the interior tank volume 30 and/or the conveyor assembly 50, or portions thereof such as the conveyor belt 56 and/or flights 58, to be cleaned and/or sanitized after an operational shift. The operational arm 80 can also lower the conveyor assembly 50 into the interior tank volume 30 after cleaning and/or sanitizing, such that the submersion conveyor system 10 is ready for processing. In some aspects, the operational arm 80 is pivotably fixed about one end of the interior tank volume, such that the operational arm 80 moves in an arc motion when being raised and lowered. In an alternative embodiment, the conveyor assembly 50 is removable from the interior tank volume 30 for cleaning and/or sanitizing the interior tank volume 30 and/or the conveyor assembly 50, or portions thereof such as the conveyor belt 56 and/or flights 58. In another alternative embodiment, the conveyor assembly 50 is stationary, such that it is not capable of being raised or removed.

The conveyor drive motor 60 can be located proximate the product discharge end 34, with the conveyor belt take up 62 located proximate the product entrance end 32. Alternatively, the conveyor drive motor 60 can be located proximate the product entrance end 32 and the conveyor belt take up 62 located proximate the product discharge end 34.

In some embodiments, the submersion conveyor system 10 comprises a product in-feed hopper (not shown) for continually feeding the product load 100 into the semi-enclosed volumes B as the conveyor belt 56 and the plurality of flights 58 continually move in the loop A' during processing.

In some embodiments, such as shown in FIG. 3, the submersion conveyor system 10 may comprises a product discharge chute 82 for expelling the product load 100 after the product load 100 has undergone complete submersion within the processing liquid 38 within the submersion tank portion 24'.

During normal operation, the submersion conveyor system 10 can provide a washing, rinsing, coating, treating, sanitizing, and/or chilling or heating of the material 100 being processed. The material 100 to be processed can comprise a solid material, a gelatinous material, or a granular material. Preferably, the material 100 to be processed is a food product. In some preferred embodiments, the food product is a protein food product, such as poultry (i.e., chicken, turkey, duck), beef, pork, and fish or parts thereof. In some other preferred embodiments, the food product is produce (i.e., fruits or vegetable) or nuts.

During operation, the interior tank volume 30 can be filled with a processing liquid 38 to a liquid processing line 36, the liquid processing line having a height within the interior tank volume 30 such that the conveyor belt 56 and respective flights 58, as well as the product 100 contained therein, are completely submersed within the processing liquid 38 when the conveyor belt 56 and respective flights 58 are located proximate the submersion tank portion 24'. In some embodiments, the conveyor track guide ensures that the entire conveyor belt 56 and respective flights 58, and thus the respective semi-enclosed volume B, located proximate the submersion tank portion 24' travel under the surface of the processing liquid 38. As the semi-enclosed volume B and the material 100 contained therein are made to move in a downward slope along the material transport bed 24 into the submersion tank portion 24' and thus the processing liquid 38, the entire semi-enclosed volume B, including the material 100 contained therein, is forced under a surface of the processing liquid 38. If the material 100 has a density that is higher than the processing liquid 38, the material 100 will settle to the bottom of the semi-enclosed volume B but will be continually pushed forward by the trailing flight 58" of the respective semi-enclosed volume B along the material transport bed 24. If the material 100 has a density that is lower than the processing liquid 38, the material 100 will be subjected to an upward force that is equal to the weight of the processing liquid volume the material 100 is displacing. This upward force will cause the material 100 to rise or buoy up; however, the conveyor belt 56 forming the top of the semi-enclosed volume B keeps the material 100 from floating, and because the conveyor belt 56 proximate the submersion tank portion 24 is completely submersed under the processing liquid 38, the conveyor belt 56 forces the material 100 to remain under the surface of the processing liquid 38.

The processing liquid 38 can comprise a chemical intervention solution that provides the appropriate application for the material 100 being processed. In the situation of a food product, the processing liquid 38 can comprise a chemical intervention solution chosen from chlorine, bromine, cetylpyridinium chloride (CPC), an organic acid, a peroxycarboxylic acid, trisodium phospate, acidified sodium chlorite, and chlorine dioxide.

In some preferred embodiments, the processing liquid 38 comprises at least one peroxycarboxylic acid having 2-18 carbon atoms. In some aspects, the peroxycarboxylic acid solution is chosen from peroxyformic acid, peroxypropionic acid, peroxyacetic acid, peroxybutanoic acid, peroxypentanoic acid, peroxyhexanoic acid, peroxyheptanoic acid, peroxyoctanoic acid, peroxynonanoic acid, peroxydecanoic acid, peroxyundecanoic acid, peroxydodecanoic acid, peroxylactic acid, peroxymaleic acid, peroxyascorbic acid, peroxyhydroxyacetic acid, peroxyoxalic acid, peroxymalonic acid, peroxysuccinic acid, peroxyglutaric acid, peroxyadipic acid, peroxypimelic acid, peroxysubric acid, and mixtures thereof. Preferably, the intervention solution comprises an equilibrium peroxyacetic acid or a pH modified peroxyacetic acid.

In some aspects, the equilibrium peroxyacetic acid preferably has a pH above about 3.0 and below about 7.0, in some aspects about 3.5 to about 5.5, and in some other aspects about 3.5 to about 5.0, although subranges within these ranges is contemplated.

In some aspects, the pH modified peroxycarboxylic acid preferably has a pH above about 7.0 and below about 10.0, in certain aspects a pH range of about 7.0 to about 9.5, and in some other aspects a pH range of about 7.5 to about 9.0, although subranges within these ranges is contemplated. The pH modified peroxycarboxylic acid can be prepared by combining a peroxycarboxylic acid solution, such as a peroxyacetic acid solution, with one or more buffering agents chosen from sodium hydroxide, potassium hydroxide, the sodium salt of carbonic acid, the potassium salt of carbonic acid, phosphoric acid, silicic acid or mixtures thereof, in a quantity that is necessary to bring the solution to said pH range One of ordinary skill in the art will appreciate that other alkalizing chemistries approved for direct food contact may also be used, whether alone or in combination with any of the foregoing buffering agents. The quantity of the buffering agent in a buffered peroxycarboxylic acid solution will generally be in the range of about 0.01% to about 10% by volume of the total solution, but other volumes of the buffering agent may be utilized depending upon various parameters, such as local water condition, including pH, hardness and conductivity.

Since many variations and modifications of the present invention can be made without departing from the spirit and scope of the present invention, which the above discussion, examples and data illustrate, it is intended that the present invention be construed as including all such modifications and alterations insofar as they come within the scope of the appended claims or the equivalents thereof.

The invention claimed is:

1. A submersion conveyor system for treating a food product comprising:
 a processing tank having opposing sidewalls, opposing endwalls and a material transport bed that in combination define an interior tank volume, the material transport bed having a contoured bed design extending between a product entrance end located proximate one of the opposing endwalls and a product discharge end located proximate the other opposing endwall, the contoured bed design having a first substantially horizontal portion operably connected to a decline slope proximate the product entrance end, a second substantially horizontal portion operably connected to an incline slope proximate the product discharge end, and a submersion tank portion having a third substantially horizontal portion located below a processing liquid line operably connected to and proximately located between the decline slope of the product entrance end and the incline slope of the product discharge end;
 a processing liquid comprising a chemical intervention solution comprising at least one peroxycarboxylic acid having 2-8 carbon atoms for treating a food product during normal processing operation, the processing liquid contained within the interior tank volume proximate the submersion tank portion located below the first and second substantially horizontal portions and intermediate between the decline slope of the product entrance end and the incline slope of the product discharge end in the interior tank volume;
 a conveyor assembly located on an operational arm, the operational arm capable of raising the conveyor assembly away from the interior tank volume and lowering the conveyor at least partially within said interior tank volume during normal processing operation, the conveyor assembly comprising a conveyor belt having an axial length with an enclosed loop configuration, a width defined between opposing side-ends, and a continuous material extending the width between the opposing side-ends, each opposing side-end proximately located a respective opposing sidewall of the processing tank during normal processing operation, and a plurality of flights positioned along the axial length of the conveyor belt, each of the plurality of flights extending at least a portion of the width of the conveyor belt between the opposing side-ends, and the plurality of flights forming a plurality of sets of adjacent flights, such that each set of adjacent flights has a front flight and a back flight and the back flight of the first set of adjacent flights forms the front flight for the second set of adjacent flights, and the conveyor assembly configured to rotate the conveyor belt in a processing motion defined by the plurality of flights rotating the axial length of the enclosed loop configuration of the conveyor belt in a direction from the product entrance end through the submersion tank portion and to the product discharge end and then back to the product entrance end during normal processing operation; and
 a plurality of submersion-enclosure volumes each containing one or more food products proximately located the submersion tank portion, each submersion-enclosure volume defined by at least one set of adjacent flights such that the front flight forming a front side and the back flight forming an opposing back side, a corresponding portion of the material transport bed proximately located the submersion tank portion forming a bottom, a corresponding portion of the opposing sidewalls forming opposing sides, and a corresponding portion of the conveyor belt forming a top, such that the submersion conveyor system is configured to completely submerse the submersion-enclosure volumes and the one or more food products contained in each of the plurality of submersion-enclosure volumes below the processing line within the chemical intervention solution as each submersion-enclosure volume moves through the submersion tank portion in a direction from the decline slope of the product entrance end to the incline slope of the product discharge end during normal processing operation
 wherein the submersion conveyor system is configured to introduce the one or more food products between each set of adjacent flights at the product entrance end, convey the one or more food products from the first substantially horizontal portion and down the decline slope to the submersion tank portion to treat the one or more food products by complete submersion within the respective submersion-enclosure volume below the processing liquid line within the chemical intervention solution proximate the submersion tank portion of the interior tank volume, and then convey the one or more food products from the submersion tank portion up the incline slope to the second substantially horizontal portion to then discharge the one or more food products from the each set of adjacent flights at the product discharge end, as the conveyor belt rotates from the product entrance end to the product discharge during normal processing operation; and wherein the top of each submersion-enclosure volume formed by the conveyor belt is completely submersed below the processing line within the chemical intervention solution proximate the submersion tank portion of the interior tank volume, and the top of each submersion-enclosure volume formed by the conveyor belt is configured to keep the one or more food products contained within the submersion-enclosure volume completely submersed below the processing line within the chemical intervention solution proximate the submersion tank portion of the interior tank volume during normal processing operation.

2. A submersion conveyor system according to claim 1, the conveyor assembly further comprising a conveyor support frame system providing a conveyor track having a top side and a bottom side, a conveyor drive motor, and a conveyor belt take up.

3. A submersion conveyor system according to claim 1, wherein conveyor belt and the plurality of flights in the processing motion during normal operation move in a continual looping motion in a direction from the product entrance end to the product discharge end with respect to the material transport bed, including the submersion tank portion of the material transport bed, and then from the product discharge end back to the product entrance end with respect to the area located above the conveyor belt, with the plurality of flights rigidly attached to the conveyor belt forming substantially the same contour of at least that of the material transport bed and a bottom of the submersion tank portion.

4. A submersion conveyor system according to claim 1, further comprising a conveyor support frame system configured to retain the conveyor belt in a support guide assembly located on both sides of the conveyor belt proximate the two associated opposing side walls, which maintains the position of the conveyor belt as it is driven by a conveyor drive motor.

5. A submersion conveyor system according to claim 1, wherein the conveyor belt and the plurality of flights follow the contour of at least the material transport bed in a continual looping motion during normal operation.

6. A submersion conveyor system according to claim 1, wherein the plurality of flights attached to the conveyor belt are substantially perpendicular to and extending away from an outer surface of the conveyor belt.

7. A submersion conveyor system according to claim 6, wherein each of the plurality of flights have a top edge that are proximately located the material transport bed and submersion tank bottom within the interior tank volume when the respective portion of the conveyor belt and the respective flights of that portion of the conveyor belt are located on an underside of the conveyor track, with a respective portion of the conveyor belt located further away from the material transport bed and submersion tank bottom than the top edges of the respective flights.

8. A submersion conveyor system according to claim 7, wherein the top edges of the respective plurality of flights attached to that portion of the conveyor belt are substantially perpendicular and extending away from the interior tank volume when a respective portion of the conveyor belt is located on the topside of the conveyor track.

9. A submersion conveyor system according to claim 7, wherein the top edge of each of the flights is proximately located the material transport bed and/or the submersion tank portion when the respective portion of the conveyor belt and respective flights are located on the bottom side of the conveyor track.

10. A submersion conveyor system according to claim 7, wherein the top edges of the flights comprise a plastic material that minimizes friction when operably engaging with the material transport bed and/or the submersion tank portion.

11. A submersion conveyor system according to claim 1, wherein the material transport bed and/or the submersion tank bottom comprise stainless steel.

12. A submersion conveyor system according to claim 1, further comprising a space between a top edge of at least a portion of the flights and the material transport bed and/or the submersion tank bottom when the conveyor belt is located on the bottom side of the conveyor track, the space allowing for a restriction-free motion of the conveyor belt during normal operation.

13. A submersion conveyor system according to claim 12, wherein the space between the top edges of the flights and the material transport bed is in a range between about $\frac{1}{16}$ inch and about 6 inches.

14. A submersion conveyor system according to claim 1, wherein there is a gap between the opposing tank sidewalls and a side edge of the conveyor belt and/or plurality of flights allowing for a restriction-free motion of the conveyor belt during normal operation.

15. A submersion conveyor system according to claim 14, wherein the gap between the opposing tank sidewalls and each side edge of the conveyor belt is in a range between about $\frac{1}{16}$ inch and about 6 inches.

16. A submersion conveyor system according to claim 14, wherein the gap between the opposing tank sidewalls and each side edge of the conveyor belt is in a range between about $\frac{1}{4}$ inch and about 4 inches.

17. A submersion conveyor system according to claim 1, wherein as two adjacent flights on the conveyor belt are positioned above the material transport bed and/or submersion tank bottom proximate the submersion tank portion, a first submersion-enclosure volume is formed by the two adjacent flights, the first flight forming a leading end and the second flight forming a trailing end, the conveyor belt forming a top of the submersion-enclosure volume, a respective portion of the opposing tank sidewalls forming side ends of the submersion-enclosure volume, and a bottom of the material transport bed and/or submersion tank bottom defining a bottom end of the submersion-enclosure volume.

18. A submersion conveyor system according to claim 17, wherein during normal processing operation of the conveyor system, the second flight forming the trailing end forms a leading end in a subsequent submersion-enclosure volume and a next adjacent flight forming the trailing end of the subsequent submersion-enclosure volume.

19. A submersion conveyor system according to claim 1, wherein the conveyor belt comprises a perforated material comprising plastic, rubber, metal or combinations thereof.

20. A submersion conveyor system according to claim 1, wherein the material transport bed comprises a metal material.

21. A submersion conveyor system according to claim 1, wherein at least a portion of the material transport bed comprises a perforated material.

22. A submersion conveyor system according to claim 21, wherein a portion of the material transport bed comprises a perforated material proximately located between the submersion tank portion and the product discharge end.

23. A submersion conveyor system according to claim 1, further comprising one or more air sparge inlets.

24. A submersion conveyor system according to claim 1, further comprising one or more water inlets.

25. A submersion conveyor system according to claim 1, further comprising at least one drain.

26. A submersion conveyor system according to claim 1, further comprising a water spill over weir and/or scum skimmer.

27. A submersion conveyor system according to claim 1, wherein each of the plurality of flights has a length extending away from the conveyor belt, the length being in the range between about 1 inch to about 3 feet.

28. A submersion conveyor system according to claim 1, wherein the submersion tank portion is configured to have at least one substantially horizontal portion.

29. A submersion conveyor system according to claim 1, further comprising a tensioner for keeping the conveyor belt tight during processing.

30. A submersion conveyor system according to claim 1, wherein the operational arm is pivotably fixed about the product entrance end or the product discharge end of the interior tank volume such that one end of the operational arm is capable of raising the conveyor assembly away from the interior tank and lowering the conveyor assembly at least partially into the interior tank volume.

31. A submersion conveyor system according to claim 1, further comprising a product in-feed hopper or feed belt for continually feeding a product load between each set of adjacent flights proximate the product entrance end as the conveyor belt and the plurality of flights continually move in a looping motion of the processing motion during normal processing operation.

32. A submersion conveyor system according to claim 1, further comprising a product discharge chute or conveyor belt for expelling a product load from each set of adjacent flights proximate the product discharge end after the product load has undergone complete submersion within the processing liquid within the submersion tank portion during normal processing operation.

33. A submersion conveyor system according to claim 1, wherein the one or more food products is chosen from poultry, beef, pork, fish, produce, nuts and combinations thereof.

34. A submersion conveyor system according to claim 1, wherein the chemical intervention solution comprises at least one peroxycarboxylic acid is chosen from peroxyformic acid, peroxypropionic acid, peroxyacetic acid, peroxybutanoic acid, peroxypentanoic acid, peroxyhexanoic acid, peroxyheptanoic acid, peroxyoctanoic acid, peroxynonanoic acid, peroxydecanoic acid, peroxyundecanoic acid, peroxydodecanoic acid, peroxylactic acid, peroxymaleic acid, peroxyascorbic acid, peroxyhydroxyacetic acid, peroxyoxalic acid, peroxymalonic acid, peroxysuccinic acid, peroxyglutaric acid, peroxyadipic acid, peroxypimelic acid, peroxysubric acid, and mixtures thereof.

35. A submersion conveyor system according to claim 1, wherein the chemical intervention solution comprises a pH modified peroxyacetic acid solution having a pH greater than 7.0 and below about 10.0.

36. A submersion conveyor system according to claim 1, wherein the chemical intervention solution comprises peroxyacetic acid, peroxylactic acid, or a mixture thereof.

* * * * *